United States Patent Office 3,684,728
Patented Aug. 15, 1972

3,684,728
OPTICAL BRIGHTENING PREPARATIONS
Bruno Kissling, Grenzacherweg 313, Riehen, Basel-Land, Switzerland, and Helmut Pummer, Jurastrasse 6, Therwil, Basel-Land, Switzerland
No Drawing. Filed Sept. 11, 1970, Ser. No. 71,334
Claims priority, application Switzerland, Sept. 12, 1969, 13,802/69; July 15, 1970, 10,733/70
Int. Cl. C09k 1/02
U.S. Cl. 252—301.2 W                10 Claims

ABSTRACT OF THE DISCLOSURE

This invention relates to optical brightening preparations which consist of an anionic optical brightener and a water soluble polyamide amine or a polyether amine in the weight ratio of 1:0.1 to 1:15 or preferably 1:0.15 to 1:0.6 or 1:3 to 1:11.

---

This invention relates to optical brightening preparations which consist of an anionic optical brightener and a polyamide amine or a polyether amine in the weight ratio of 1:0.1 to 1:15 or preferably 1:0.15 to 1:0.6 or 1:3 to 1:11.

Anionic optical brighteners suitable for the disclosed optical brightening preparations include brighteners of the stilbene triazinyl series, notably those of formula

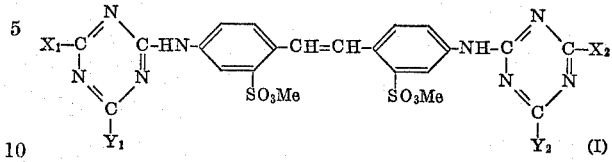

(I)

where Me stands for a monovalent cation ($Na^\oplus$, $K^\oplus$, $NH_4^\oplus$, $NH^\oplus(CH_3)_3$, $NH_3^\oplus$—$C_2H_4OH$, etc.), $X_1$ and $X_2$, independently of each other, for an alkoxy, alkylamino, hydroxyalkylamino, N-alkyl-N-hydroxy-alkylamino, dihydroxyalkylamino or N-cyanalkyl-N-hydroxy-alkylamino radical or for the morpholine or piperidine radical, and $Y_1$ and $Y_2$, independently of each other, for an aryloxy radical of the benzene series, an amino group, an alkylamino group or an arylamino group of the benzene, naphthalene or diphenyl series; and where alkyl and alkoxy bear, e.g. 1 to 6 carbon atoms and the aryl radicals may bear substituents such as alkyl, alkoxy, acylamino, sulphonic acid or carboxylic acid groups and halogen atoms.

The products listed in Table 1 are representative members of this group of brighteners.

TABLE 1

| | $X_1$ | $X_2$ | $Y_1$ | $Y_2$ | Me |
|---|---|---|---|---|---|
| A | —NH—$C_2H_4$OH | —NH—$C_2H_4$OH | ⌬—NH— | ⌬—NH— | Na |
| B | —NH—$C_2H_4$OH | —NH—$C_2H_4$OH | Same as above | Same as above | $NH_4^+$ |
| C | —NH—$C_2H_4$OH | —NH—$C_2H_4$OH | —$NH_2$ | —$NH_2$ | Na |
| D | —NH—$C_2H_4$OH | —NH—$C_2H_4$OH | —$NH_2$ | —$NH_2$ | K |
| E | —NH—$C_2H_4$OH | —NH—$C_2H_4$OH | ⌬(CH$_3$)—NH— | ⌬(CH$_3$)—NH— | Na |
| F | —NH—$C_2H_4$OH | —NH—$C_2H_4$OH | $CH_3$-CO-HN—⌬—NH— | $CH_3$-CO-HN—⌬—NH— | |
| G | —NH—$C_2H_4$OH | —NH—$C_2H_4$OH | —NH—$C_2H_4$OH | —NH—$C_2H_4$OH | Na |
| H | —NH—$C_2H_4$OH | —NH—$C_2H_4$OH | $NaO_3S$—⌬—NH— | $NaO_3S$—⌬—NH— | Na |
| I | -NH-$CH_2$-CHOH-$CH_3$ | —NH-$CH_2$-CHOH-$CH_3$ | ⌬(OCH$_3$)—NH— | ⌬(OCH$_3$)—NH— | Na |
| K | -NH-$CH_2$-CHOH-$CH_3$ | -NH-$CH_2$-CHOH-$CH_3$ | ⌬—NH— | ⌬—NH— | Na |
| L | -NH-$CH_2$-CHOH-$CH_3$ | -NH-$CH_2$-CHOH-$CH_3$ | ⌬(Cl)—NH— | ⌬(Cl)—NH— | Na |
| M | -NH-$CH_2$-CHOH-$CH_3$ | -NH-$CH_2$-CHOH-$CH_3$ | ⌬(SO$_3$Na)—NH— | ⌬(SO$_3$Na)—NH— | Na |
| N | -NH-$CH_2$-CHOH-$CH_3$ | -NH-$CH_2$-CHOH-$CH_3$ | —$NH_2$ | —$NH_2$ | Na |
| O | -NH-$CH_2$-CHOH-$CH_3$ | -NH-$CH_2$-CHOH-$CH_3$ | naphthyl(SO$_3$Na, NaO$_3$S)—NH— | naphthyl(SO$_3$Na, NaO$_3$S)—NH— | Na |

TABLE 1—Continued

| | $X_1$ | $X_2$ | $Y_1$ | $Y_2$ | Me |
|---|---|---|---|---|---|
| P | -N(C₂H₄)₂O (morpholino) | -N(C₂H₄)₂O (morpholino) | C₆H₅-NH- | C₆H₅-NH- | Na |
| Q | -N(C₂H₄OH)₂ | -N(C₂H₄OH)₂ | Same as above | Same as above | Na |
| R | -N(CH₃)(C₂H₄OH) | -N(CH₃)(C₂H₄OH) | do | do | Na |
| S | -N(C₂H₄CN)(C₂H₄OH) | -N(C₂H₄CN)(C₂H₄OH) | NaO₃S-C₆H₄-NH- | NaO₃S-C₆H₄-NH- | Na, Na |
| T | -NH-CH₂-CH₂-CO-NH₂ | -NH-CH₂-CH₂-CO-NH₂ | C₆H₅-NH- | C₆H₅-NH- | Na |
| U | -NH-CH₂-CH₂-CO-NH₂ | -NH-CH₂-CH₂-CO-NH₂ | Same as above | -NH₂ | Na |
| V | -NH-C₂H₄OH | -NH-C₂H₄OH | do | Cl-C₆H₄-NH- | Na |
| W | CH₃O- | CH₃O- | do | C₆H₅-NH- | Na |
| X | CH₃O- | CH₃O- | C₆H₅-O- | C₆H₅-O- | Na |
| Y | CH₃O- | CH₃O- | NaO₃S-C₆H₄-NH- | NaO₃S-C₆H₄-NH- | Na |
| Z | CH₃NH- | CH₃NH- | C₆H₅-NH- | C₆H₅-NH- | Na |
| AA | -N(C₂H₄OH)₂ | -N(C₂H₄OH)₂ | NaO₃S-C₆H₄-NH- | NaO₃S-C₆H₄-NH- | Na |
| AB | -N(CH₃)(C₂H₄OH) | -N(CH₃)(C₂H₄OH) | (SO₃Na)C₆H₄-NH- | (SO₃Na)C₆H₄-NH- | Na |
| AC | CH₃O- | CH₃O- | -NH-C₂H₄OH | -NH-C₂H₄OH | Na |
| AD | -N(C₂H₄OH)₂ | -N(C₂H₄OH)₂ | (SO₃Na)C₆H₄-NH- | (SO₃Na)C₆H₄-NH- | Na |
| AE | -N(CH₃)(C₂H₄OH) | -N(CH₃)(C₂H₄OH) | NaO₃S-C₆H₄-NH- | NaO₃S-C₆H₄-NH- | Na |
| AF | C₂H₅O- | C₂H₅O- | -NH-C₂H₄OH | -NH-C₂H₄OH | Na |
| AG | -N(C₂H₅)(C₂H₄OH) | -N(C₂H₅)(C₂H₄OH) | -NH₂ | -NH₂ | Na |
| AH | -N(C₂H₅)(C₂H₄OH) | C₆H₅-NH- | -NH₂ | -NH₂ | Na |
| AI | CH₃O- | CH₃O- | NaO₃S-C₆H₄-NH- | -NH₂ | Na |
| AK | C₂H₅NH- | C₂H₅NH- | NaO₃S-C₆H₄-NH- | -NH₂ | Na |
| AL | -N(C₂H₄-CO-NH₂)(C₂H₄-OH) | -N(C₂H₄-CO-NH₂)(C₂H₄-OH) | C₆H₅-NH- | C₆H₅-NH- | Na |
| AM | -N(C₂H₄-CO-NH₂)(C₂H₄-OH) | -N(C₂H₄-CO-NH₂)(C₂H₄-OH) | CH₃-C₆H₄-NH- | CH₃-C₆H₄-NH- | Na |

The following are examples of other suitable brighteners: sodium 3,7-diacylamino - dibenzothiophenedioxide-2,8-disulphonate, such as

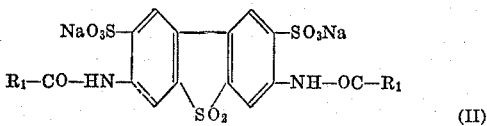

wherein each $R_1$ represents

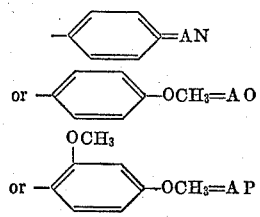

derivatives of 7-aminocumarin, such as

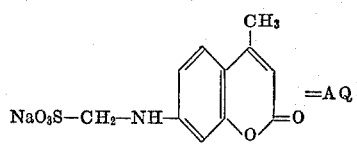

derivatives of stilbenylnaphthotriazole, such as

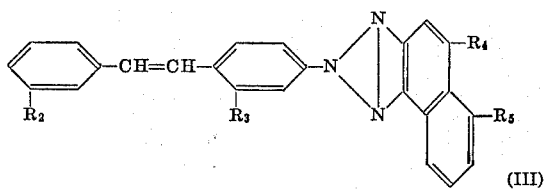

| | $R_2$ | $R_3$ | $R_4$ | $R_5$ |
|---|---|---|---|---|
| AR | —SO$_3$Na | H | H | H |
| AS | H | —SO$_3$Na | —SO$_3$Na | H |
| AT | Cl | —SO$_3$Na | H | —SO$_3$Na |
| AU | H | —SO$_3$Na | H | H | derivatives of dehydrothiotoluidine, such as

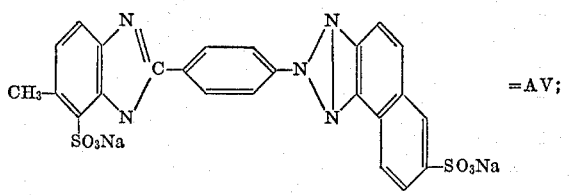

derivatives of oxacyanine such as 3,3',5,5',7,7'-hexamethyloxacyanine-p-sulphonate=AW;
derivatives of bis-azoles, such as the sodium salt of sulphonated 2,2'-bis-[(phenylvinylidene) - 6,6' - oxazole] =AX;
derivatives of sulphonated 2,2'-bis-[(phenylvinylidene)-6,6'-thiazole]=AY;
derivatives of sulphonated 2,2'-bis-[(phenylvinylidene]-6,6'-imidazole]=AZ;
derivatives of diphenylazoles, such as the sodium salt of sulphonated 2-styryl-5-phenyloxazole=BA;
the sodium salt of the sulphonated 2-naphthyl-5-phenylthiazole=BB;
the sodium salt of sulphonated 2-naphthyl-5-phenylimidazole=BC;
derivatives of an α,β-di(benzididazoyl)-ethylene, such as the sodium salt of sulphonated α,β-di(benzimidazyl-2)-ethylene=BD;
derivatives of diphenyl-imidazolone, such as the sodium salt of sulphonated 4,5-diphenylimidazolone=BE;

Examples of polyamide amines are e.g. crosslinked cationic products formed by condensation of dicarboxylic acids of formula

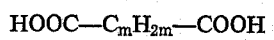 (IV)

where $m$ represents a whole number from 4 to 8, and of the functional derivatives of these acids, with polyamines which contain two primary amino groups, at least one imino group and alkylene groups having 2 to 4 carbon atoms, in a molecular ratio of 0.8:1 to 1.2:1.

The dicarboxylic acids of Formula IV include pentane-1,5-, hexane-1,6-, heptane-1,7-, octane-1,8-dicarboxylic and butane-1,4-dicarboxylic acid (adipic acid), the last-named being preferred. Branched dicarboxylic acids such as β-methyladipic acid are also suitable.

The polyalkylene polyamines are exemplified by diethylene and dipropylene triamine, triethylene and tripropylene tetramine, tetra-ethylene and tetra-propylene pentamine (these are derived from 1,2-propylene imine), penta-ethylene hexamine and bis-(3-aminopropyl)-imine.

The following may be named as examples of suitable crosslinking agents: 1,2-dichloroethane, divinyl sulphone, diallylamine, epichlorohydrin, epibromohydrin, diglycidyl ether and the reaction products of epichlorohydrin with ammonia, primary or preferably secondary amines, such as the compounds of formula

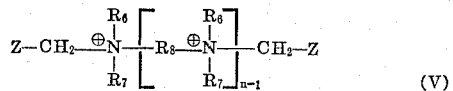 (V)

where $n$ represents a number from 1 to 8, $R_6$ and $R_7$ each represents a lower alkyl or hydroxyalkyl, $R_8$ represents an alkylene radical with 2 to 6 carbon atoms, a 2-hydroxy-1,3-propylene radical or one of the radicals

—CH$_2$CH$_2$—NH—CO—NH—CH$_2$—CH$_2$— or

—CH$_2$—CH$_2$—CH$_2$—NH—CO—
　　　　　　　　　　　NH—CH$_2$—CH$_2$—CH$_2$— and Z represents

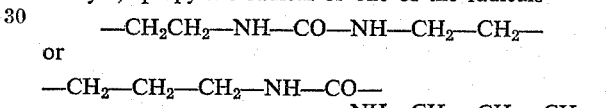

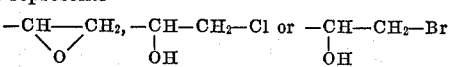

The condensation products of dicarboxylic acids and polyalkylene polyamines are treated with crosslinking agents in such a manner that crosslinking of the molecule takes place with simultaneous alkylation or quaternation of at least one of the basic nitrogen atoms. The reaction is allowed to proceed only for as long as the newly formed product has good water solubility.

In addition to the crosslinking agent, an alkylating or quaternating agent without crosslinking action can be employed for alkylation or quaternation, such as dimethyl sulphate, diethyl sulphate, methyl chloride, butyl bromide, benzyl chloride, methyl benzene-sulphonate, ethyl benzene-sulphonate, or 4-methylbenzene-sulphonate.

Examples of polyamide amines of the above type are described in United States Pats. 2,926,154 and 3,329,657 and in Belgian Pat. 721,332.

The polyether amines employed in the reaction can be prepared, for example, by the reaction in exces amounts of aliphatic polyamines, which have molecular weights of maximum 200, contain at least one primary or two secondary amino groups and may bear hydroxyl groups with polyepihalogenohydrins bearing 3 to 25 halogenomethyl groups, followed by removal of the excess polyamine by distillation and reaction of the resulting polyether amine with a crosslinking agent in aqueous solution to a point at which the viscosity increases while the reaction mixture remains water soluble, on which any free amino groups present are wholly or partly converted into the salts by the addition of acid.

The following polyamines may be named to exemplify those suitable for use in the present process: 1,2-diaminoethane, 1,2-diaminopropane, 1,2-diaminobutane, 1,3-diaminopropane, 1,4-diaminobutane, 1,6-diaminohexane, N-(2'-hydroxyethyl)-1,2-diaminoethane, 1,3-diamino-2-propanol, 3-dimethylamino-propylamine, piperazine, N-(2-aminoethyl)-piperazine, diethylene triamine, triethylene tetramine, tetraethylene pentamine, N,N-bis-(3-aminopropyl)-amine, N,N'-bis-(2"-aminoethyl) - 1,4 - diaminobutane and tri-(3-aminopropyl)-amine. These aliphatic polyamines consist of amino groups which are bound to each other through alkylene radicals and may be substituted by alkyl or hydroxyalkyl radicals; the number of substituents on the N atoms is kept sufficiently low for the polyamine to contain at least one primary or two secondary amino groups. The polyamine of lowest molecular weight conforming to this definition is 1,2-diaminoethane. The molecular weight of these polyamines generally should not be higher than approximately 200, so that the excess unreacted amine can be removed from the reaction mixture by distillation at temperatures at which the reaction product is stable.

The polyepihalogenohydrins used as starting materials in the present process are known compounds or can be produced by generally known analogous methods. They contain as main constituent polyether chains which can be characterized by the following general formula

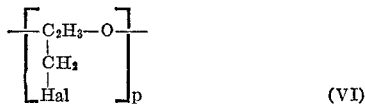

where Hal represents medium halogen, i.e. chlorine or bromine, and $p$ a number from 3 to 25. In the production of polyepihalogenohydrins mixtures of products polymerized to different degrees are obtained; accordingly, in the present context $p$ or the molecular weight defined by $p$ stands for an average number or an average molecular weight. On the basis of the terminal groups attached to the beginning and end of the polymer chain of Formula VI, the polyepihalogenohydrins of interest for the present purpose can be divided into the following groups:

(I) By using water and alcohols having 1 to 6 carbon atoms and 1 to 6 hydroxyl groups, or ether alcohols formed by adding ethylene oxide into these alcohols, as "starters" for the polymerisation of epihalogenohydrin, polyepihalogenohydrins are obtained of formula

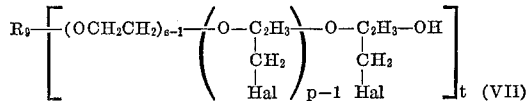

wherein $R_9$ may represent hydrogen if $s$ stands for the number 1, or otherwise an alkyl radical, a mono- to penta-hydroxyalkyl radical having not more than 6 carbon atoms, Hal represents chlorine or bromine, $t$ represents a whole number from 1 to 6, $s$ a whole number from 1 to 20 and $p$ a whole number from 3 to 25, where the sum of the OH groups in $R_9$ is at the most 6-t and the multiplication product of $p \cdot t$ is at least 3 and not more than 25.

(2) A second group of polyepihalogenohydrins is obtained by converting single halogenohydrin terminal groups or all the halogenohydrin terminal groups in Formula VII into the corresponding epoxide groups.

(3) A third group are epihalogenohydrin polymers formed by acid catalysis without "starters"; in these the exact constitution of the terminal groups is not known.

(4) A further group are the polymers produced from epihalogenohydrins with catalysts other than acid catalysts, provided that they are not of too high molecular weight, i.e. $p$ in Formula VI may not exceed 25. Catalysts of this type are described in U.S. Pat. 3,058,923.

The polyepihalogenohydrins of these four groups are accessible by known methods described in the literature, for example in the following publications:

British Patents 477,843 and 898,306;
U.S. Pats. 2,483,749; 2,856,370; 2,599,799; 2,871,219; 2,891,073; 3,058,921; 3,158,580; 3,305,565;
J. Polymer Science 40, 571 (1959); 47, 486 (1960);
Bull. Chem. Soc. Japan 33, 727 (1960);
J. Appl. Polymer Science 6, 643 (1962);
Chemical Abstracts 59, 2959h (1963); 60, 12111c; 12113d (1964); 65, 12290c (1966).

The brightener preparations of this invention can be conveniently produced in aqueous medium, if necessary in the presence of water soluble solvents such as lower alcohols, methanol, ethanol, iso-propanol, n-propanol, ethers such as dioxan, 1,2-dimethoxy-ethane, 1,2-diethoxy-ethane, ether alcohols such as 2-methoxy-, 2-ethoxy- or 2-n-butoxy-ethanol, 2-(2'-methoxyethoxy)-ethanol, 2-(2'-ethoxyethoxy)-ethanol or 2-(2'-n-butoxyethoxy)-ethanol, ketones such as acetone and methylethyl ketone, amides such as foramide, dimethyl formamide and dimethyl acetamide, and hexamethyl phosphoric acid triamide.

It is preferable to dissolve the anionic optical brightener in about 5 to 30 times the amount of water with heating, e.g. to a temperature of 50° C. to 100° C. as required, and to run the solution into the aqueous, e.g. 10–15% solution of the polyamide amine or polyether amine at temperatures of e.g. 50° C. to 100° C. Depending on the concentration of the anionic brightener solution and the solution of the polyamide amine or polyether amine and the volume ratio, solutions, suspensions or gels are obtained. For practical application solutions are preferred. Solutions can be converted into suspensions, gels, semisolid or solid products by evaporation.

The brightener preparations produced in accordance with this invention are suitable for brightening a wide variety of substrates, including the mineral pigments used as fillers in the manufacture of paper and board. Examples of these mineral pigments are finely divided silicates such as china clay, talc, diatomites (diatomaceous earth) amianthus, steatite, asbestos, asbestines, calcium silicate obtained in a highly active form by mixing cold, concentrated solutions of calcium chloride and sodium silicate, glass powder, quartz sand, finely divided sulphates such as gypsum, analine, ground gypsum, satin white, heavy spar, blanc fixe, finely divided carbonates such as calcium carbonate, e.g. chalk, magnesite, patent white (witherite), white lead, dolomite, zinc spar, finely divided oxides and hydroxides such as titanium dioxide, aluminum oxide and hydroxide, baryta, calcium hydroxide, burnt magnesa, zinc white, finely divided calcium sulphite, and finely divided sulphides such as zinc sulphide and lithopones.

Mineral pigments brightened with the disclosed brightening preparations are so much the faster to bleeding, the greater the weight ratio of the polyamide amine or polyether amine to the anionic optical brightener in the preparation.

The brightening preparations can be used further for brightening bleached and unbleached paper stocks prepared with mechanical wood pulp or with sulphate, sulphite or other types of chemical pulp.

The aqueous suspension of the substrate is mixed with a cold to lukewarm aqueous solution (e.g. at 10–40° C.) of a brightening preparation of the disclosed type. The resulting solution may contain, e.g. 1–5% of the anionic optical brightener and 5–25% of the polyamide amine in a quantitative ratio of brightener to polyamide amine of, e.g. 1:3 to 1:11. In relation to the weight of the dry substrate the amount of the anionic optical brightener may be 0.001% to 1% or more especially 0.01% to 0.5%, the optimum amounts being 0.05% to 0.4%.

In addition to the optical brightening effect, solid substrates brightened with the disclosed preparations serve to prevent or minimize two-sidedness in paper manufacture, which is evident as a difference in shade between the two sides in coloured papers and as a difference in the degree of whiteness in uncoloured papers. It arises from the accumulation on one side of the sheet of the components of the furnish which are brighter or more deeply coloured than the other components. These distribution changes are apt to occur at the wet end of the paper machine as the water is drained from the wet web; the danger is acute on machines operated at high speeds. The suction applied to the wet moving web by the tube rolls, suctions boxes and suction roll leads to a powerful flow of liquid, which owing to the different specific gravities of the components in the furnish results in differences in the relative amounts of these components on the top or "felt" side and the bottom or "wire" side of the sheet. Thus the top side may contain a higher proportion of fillers than the wire side due to these heavier components having been washed out from this side with the water. In dyed papers the resulting differences are very noticeable because of the pronounced colour difference between the paper fibre and the filler. Marked colour differences appear between the two sides of the sheet when an optical brightener is incorporated in the furnish which is absorbed on the paper fibre but not on the filler particles. There is also a danger of two-sided and unlevel effects appearing in the sheet if the paper stock contains fibres which differ in their affinity and binding power for the optical brightener. Although the commonly used optical brighteners are absorbed by the fibres and the fillers in the furnish, there is generally a considerable difference in whiteness or shade between the fibres and filler in the sheet. The amount of brightener necessary for brightening fillers such as china clay is substantially greater than what is needed for bleached paper. Therefore, if the china clay tends to be unevenly distributed in sheet formation, more intense brightening is desirable where more filler is present in the furnish, which is mainly on the top side of the sheet, in order to compensate for the lower brightness which would otherwise result. With the disclosed brightening preparations this effect is achieved by mixing the preparation separately with the filler, preferably a china clay grade, and incorporating the brightened filler in the furnish to act as a solid fluorescence carrier. As the newly formed sheet of paper dries, a certain amount of the brightened filler particles migrates to adjacent paper fibres. Accordingly, where the sheet contains more filler than is present elsewhere more optical brightener is available for the fibres, which suppresses the white two-sidedness that would otherwise be in evidence.

By employing for paper manufacture fibrous materials and/or fillers previously treated with the brightening preparations of this invention, the tendency to two-sidedness and unlevelness in sheet formation can be very largely corrected.

Besides paper manufacture, there are further uses for optically brightened substrates in processes where the aim is to apply the brightener partially bound on a solid substrate, either to prevent premature absorption of the brightener where it is not desired or to obtain the maximum optical surface effects, as in the printing and coating of flat materials.

In the following examples the parts and percentages are by weight and the temperatures in degrees centigrade.

EXAMPLE 1

1000 parts of a 10% china clay suspension are brightened at 20–25° with 0.6 part of a solution of brightening preparation ①, prepared as as described below. The brightened china clay is added to the furnish shortly before sheet formation in the Sandoz Pulsator, an apparatus which simulates the conditions of sheet formation on the paper machine leading to structural two-sidedness (cf. Textil-Rundschau 17, 645–653, especially 647–649 (1962)).

The pH of the furnish is about 4.5 and its composition is as folllows:

100 parts bleached sulphite pulp, freeness value 40° S.R.
0.04 part brightener R
2 parts rosin size
3 parts alum
400 parts china clay dispersion as above=40 parts brightened china clay The reflectance of the sheet formed in the Sandoz Pulsator using china clay brightened with the disclosed preparation is measured at 460 nm. with filter R–46 and the fluorescence with the Zeiss Elrepho fluorimeter; the difference in whiteness between the wire and top sides of the sheet is 0.8 point. The control sheet made with untreated china clay shows a whiteness difference of 2.6 points. For the control sheet twice the amount, i.e. 0.08 part, of brightener R is used to obtain the same degree of brightening.

The brightening preparation ① used in this example is produced as follows.

34 parts of a 30% polyamide amine solution ①, prepared as given below, are mixed with 4 parts of 2 normal sodium hydroxide solution, with the subsequent addition of 38 parts of a 33% solution of brightener ⑦ and 24 parts of a 20% solution of brightener ㊹. The whole is stirred thoroughly to give a yellowish solution of pH 9.6. The polyamide amine solution ① is prepared as follows.

In a vessel fitted with a stirrer and external cooling system, 109 parts (1.06 moles) of diethylene triamine are slowly diluted with 40 parts of water so that the interior temperature remains below 70°. 146 parts (1.00 mole) of the pulverized adipic acid are slowly added to allow the inside temperature to be kept at 50–90° by external cooling. The vessel is closed and connected to a fractionating column with an attached descending cooler. In one hour the reaction solution is raised to 120–130° on an oil bath and under a nitrogen atmosphere. It is reacted for 6 hours at 170–175° inside temperature. The water used for dissolving and that formed by condensation is distilled through the column; less than 0.4 part of dimethylene triamine is carried off with the water vapour. Stirring is continued for 3 hours at 170–175°, then the column with the descending cooler is replaced by a reflux condenser. After cooling to 150–160°, 219 parts of water are run in at a controlled rate causing the interior temperature gradually to fall to 100–105°, during which time constant refluxing is maintained. The solution is held at the boil for a further hour with reflux. On cooling a clear solution of the intermediate containing 50% solid substance is obtained.

Meanwhile 205.5 parts of ice are mixed with 112.5 parts (1 mole) of 40% dimethylamine solution in a stainless steel vessel with stirrer, then 100 parts (1 mole) of 36.5% hydrochloric acid are added, with care taken to keep the interior temperature below 25°. A solution of dimethylammonium chloride of pH 4–7 is formed. A further 112.5 parts (1 mole) of 40% dimethylamine solution are added, after which 277.5 parts of epichlorohydrin are slowly poured in so that the inside temperature remains at 28–32° with external cooling. A few hours at this temperature are allowed for completion of the reaction. The product is a clear solution containing 50% of the crosslinking agent of formula

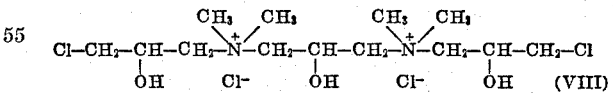

(VIII)

in a sufficient degree of purity.

No significant amounts of unreacted epichlorohydrin or nonionic by-products such as glycerin dichlorohydrin are present, which is proved by the fact that virtually nothing goes into the ether layer during distribution between ether and water. On analysis, 2 moles of chlorine in ionic and 2 moles of chlorine in nonionic form per mole of crosslinking agent are found.

In a vessel with stirrer heated by a water bath, 90 parts of the aforedescribed 50% intermediate solution are mixed with 18.3 parts of the 50% strength crosslinking agent and 27 parts of water. The solution, of 40% solid content, is stirred consecutively for 2 hours at 25–35°, 2 hours at 45° and 15 hours at 50–55°. Initially of thin consistency, the solution gradually grows more viscous and after about 8 hours takes on the form of a viscid paste with a tendency to ascend the stirrer. At the end of stirring the paste is of somewhat thinner consistency.

In order to convert the resulting product into a form more suitable for application, it is diluted to 30% strength with 45 parts of water at 50°, which gives a polyamide amine solution Ⓘ of pH 8.8–8.9.

In place of the brightening preparation ①, a solution of 37 parts of a 33% solution of brightener Ⓣ, 37 parts of a 20% solution of brightener ⒶⒷ, 1 part of 1 normal sodium hydroxide solution and 25 parts of a 20% polyether amine solution Ⅱ, prepared as given hereunder, can be employed (brightening preparation ②). The polyether amine solution Ⅱ prepared as follows: 92.5 parts (1 gram equivalent) of polyepichlorohydrin (average molecular weight 1530) are dissolved in 240 parts (4 moles) of ethylene diamine at room temperature. The solution is raised to 100° in a jet of nitrogen with stirring. At this temperature an exothermic reaction takes place; cooling is applied to prevent the temperature rising to above 140°. When the reaction is no longer exothermic, the solution is stirred for a further 2 hours at 100°. It is then cooled to about 30° and 133.3 parts (1 mole) of 30% sodium hydroxide solution are added. The water and excess ethylene diamine are distilled with vacuum. Afterwards the temperature is increased to 110–120° at 10–20 torr with continued stirring until constant weight is reached. A residue of 162.8 parts remains consisting of 58.5 parts of finely crystalline sodium chloride and 104.3 parts of liquid polyether amine.

A solution of 9.4 parts of this residue in 10.6 parts of water is mixed with 1 part of a 30% aqueous solution of the crosslinking agent of Formula VIII. The thinly liquid mixture is reacted for 18 hours at 65°, after which 10 parts of water are added. The solution thus formed contains 20% active substance and can be readily diluted with water to give homogeneous solutions of any desired strength.

EXAMPLE 2

303 parts of a 33% china clay suspension (Grade A Lump), equivalent to 100 parts of dry china clay, are mixed at room temperature with 20 parts of a solution containing 5.7 parts of the brightening preparation ③ described below, constant stirring being maintained until a homogeneous distribution is reached. The brightened china clay is washed for 2 hours and then dried. The brightening effect thus obtained is fast to bleeding.

A tablet is moulded with the dried china clay and its reflectance is measured at 460 nm. with filter R–46 and its fluorescence with the Zeiss Elrepho fluorimeter. The whiteness value of the tablet is 89.9% relative to magnesium oxide as the 100% whiteness standard.

A tablet made of the same grade of china clay, previously brightened with 0.21% of brightener Ⓢ in the normal manner, washed for 2 hours and dried, has a whiteness value of only 84.7% relative to the 100% magnesium oxide standard, which is the same as the whiteness value of unbrightened china clay.

The brightening preparation ③ used in this example is produced as follows.

50 parts of an intimate mixture of 37 parts of brightener Ⓢ, 2.7 parts of sodium dinaphthylmethane disulphonate and 10.3 parts of sodium chloride is dissolved in 300 parts of water at 85–90°. The solution is poured with thorough stirring into a mixture of 433.5 parts of the polyamide amine solution Ⓘ and 166.5 parts of water at about 80°. After homogeneous blending, the brightener preparation is allowed to cool. It contains 3.7% brightener Ⓢ and 13% polyamide amine.

Brightening preparations for china clay of comparably good quality to those described in the foregoing can be produced with the brighteners of the stilbene triazinyl series A to R and T to AM, of the 3.7-diacylamino-2,8-disulpho-dibenzothiophene dioxide series AN to AP, of the 7-aminocoumarin series AQ, of the stilbenylnaphthotriazole series AR to AU, of the dehydrothiotoluidine series AV, of the oxacyanine series AW, of the bis-azole series AX to AZ, of the diphenylazole series BA to BC and BE, and of the di-(benzimidazyl)-ethylene series BD.

EXAMPLE 3

1000 parts of a 10% china clay suspension are brightened at 20–25° with 6 parts of the solution of the brightening preparation ④ described below. The brightened china clay, which is fast to bleeding, is added to a furnish for sheet formation on the Sandoz Pulsator (see Example 1), under conditions giving approximately the same degree of whiteness on the paper fibres and the china clay.

The furnish is of about pH 4.5 and of the following composition:

100 parts bleached sulphite pulp, freeness value 40° S.R.
0.04 part brightener Ⓡ
2 parts rosin size
3 parts alum
400 parts of the above china clay suspension=40 parts of brightened china clay The reflectance of the sheet formed in the Sandoz Pulsator using china clay brightened with the disclosed preparation is measured at 460 nm. with filter R–46 and the fluorescence with the Zeiss Elrepho instrument; the difference in whiteness between the wire and the top sides of the sheet is only 0.3 point. The control sheet made with untreated china clay shows a whiteness difference of 3.2 points.

The brightening preparations ④ used in this example can be produced as follows.

50 parts of an intimate mixture of 33.3 parts of ener AL and 16.7 parts of sodium chloride are dissolved in 280 parts of water at 80–85° with stirring. The solution is stirred into 670 parts of the 30° polyamide amine solution Ⅲ described below, at a controlled temperature of 80–85°. Thorough stirring yields a clear solution which remains clears on cooling. It contains 3.33% of brightener Ⓣ and 20.1% polyamide amine.

The 30% polyamide amine solution Ⅲ is prepared as follows. 100 parts of the 50% intermediate solution prepared from adipic acid and diethylene triamine as described in Example 1 are mixed with 25.2 parts of a 50% solution of the crosslinking agent of Formula VIII and 83.8 parts of water. The mixture is raised in 1 hour to 90° in a nitrogen atmosphere with constant stirring and reacted for 2 hours at this temperature. On cooling a clear but fairly viscous 30% solution of a crosslinked cationic polyamide amine is obtained.

EXAMPLE 4

China clay brightened as in Example 2 is washed, dried and pulverized. It is added in the stated amount to a furnish of the following composition, which is converted into sheets on the Sandoz Pulsator:

100 parts bleached sulphite pulp
0.06 part brightener Ⓢ
0.5 part alum
45 parts china clay (prepared as in Example 2)

The whiteness difference between the wire and top sheets of the sheet is 0.7 Elrepho point, whereas test sheets containing normal china clay show a white difference of 5.2 points.

In Examples 3 and 4 the white two-sidedness is considerably less than otherwise, but the sheets exhibit a certain difference in shade due to the yellowish tone of the china clay. By adding to the brightening preparation 0.001 part of the acid dye of formula

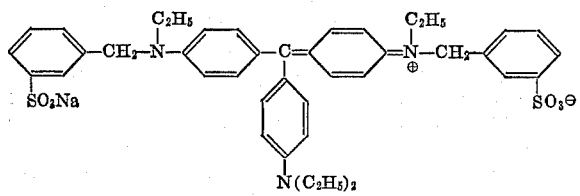

the shade difference can be substantially reduced.

EXAMPLE 5

Test sheets are formed in the Sandoz Pulsator with a furnish of 100 parts sulphite pulp
0.06 part brightener ⑧
2 parts rosin size
3 parts alum
40 parts china clay (untreated)

containing 3.2 parts of brightening preparation ④. The whiteness difference between the wire and the top sides of the sheet is 1.6 points. Control sheets made of the same furnish but without the addition of the said brightening preparation have a whiteness difference of 3.1 points in the Elrepho instrument.

This shows that appreciable, although not optimal, reduction of the white two-sidedness can be obtained without separate brightening of the china clay, provided the brightening preparation of this invention is employed.

EXAMPLE 6

303 parts of a 33% blanc fixe suspension are brightened at room temperature with 2 parts of the brightening preparation ⑤ described below. The brightened blanc fixe is washed, dried and pulverized. The brightening effect thus obtained is fast to bleeding. Measurement of its reflectance at 460 nm. in the Zeiss Elrepho using filter R-46 and of its fluorescence gives a whiteness value of 102.4% in relation to the 100% magnesium oxide whiteness standard. Untreated blanc fixe has a whiteness value of 97.8% relative to this standard.

The brightening preparation ⑤ used here is produced as follows. 50 parts of a mixture of 33.3 parts of brightener ㊶ and 16.7 parts of sodium chloride are dissolved in 395 parts of water at 60–70° with stirring. The solution is stirred into 555 parts of the 30% polyamide amine solution Ⅲ (see Example 3) at 70°. After thorough blending the resulting solution is allowed to cool. It contains 3.33% brightener ㊶ and 16.7% polyamide amine.

In place of brightening preparation ⑤, equally good results can be obtained with 3.3 parts of brightening preparation ⑥, which is produced with 20 parts of brightener ㊶, 10 parts of sodium chloride, 245 parts of water and 725 parts of the 30% polyamide amine solution Ⅲ. This brightening preparation ⑥ contains 2% brightener ㊶ and 21.7% polyamide amine.

The polyamide amine solution Ⅲ can be replaced by the equivalent amount of a 20% solution of the product formed by condensation of equimolecular amounts of adipic acid and a polyethylene or polypropylene polyamine of formula

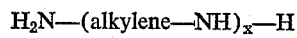

$$H_2N-(alkylene-NH)_x-H$$

where alkylene represents ethylene or propylene and $x$ 2, 3 or 4, and partially crosslinked with epichlorhydrin.

In the following table further polyamide amines and polyether amines are listed which can be produced in analogy with the procedure described in Example 1; they are specified by the compounds employed for their production.

TABLE 2

| No. | Dicarboxylic acid or its derivative | Polyepoxi compound | Polyamine | Crosslinking agent |
| --- | --- | --- | --- | --- |
| IV | Adipic acid | | Diethylenetriamine plus triethylenetetramine (1:1 mole). | Of Formula (VIII). |
| V | Adipic acid dimethylester | | do | Do. |
| VI | do | | Bis-(3-aminopropyl)-amine | Do. |
| VII | do | | 1,4-bis-(3'-aminopropyl-amino)-butane. | Do. |
| VIII | Adipic acid | | Diethylenetriamine | Of Formula (IX) (below). |
| IX | | Polyepichlorohydrin, M.W.=1,370 | do | Of Formula (VIII). |
| X | | Polyepichlorohydrin, M.W.=250 | do | Do. |
| XI | | Reaction product of 1 mole polyethyleneglycol (M.W. 400) with 7.5 moles epichlorohydrin. | do | Do. |
| XII | | Reaction product of 1 mole sorbitol with 30 moles epichlorohydrin. | do | Do. |
| XIII | | Polyepichlorohydrin, M.W.=1,370 | do | Epichlorohydrin. |
| XIV | | do | do | 1,2-bis-(2'-chloroethoxy)-ethane. |
| XV | | do | do | N,N-bis-(chloroacetyl)-ethylenediamine. |
| XVI | | do | do | Of Formula (X) (below). |
| XVII | | Reaction product of 1 mole sorbitol with 30 moles ethyleneoxide and 30 moles epichlorohydrin. | do | Of Formula (VIII). |
| XIX | Adipic acid | | Dipropylenetriamine | Do. |
| XX | do | | do | Of Formula (XI) (below). |
| XXI | do | | do | Of Formula (XII). |
| XXII | Sebacic acid | | Diethylenetriamine | Of Formula (VIII). |
| XXIII | Suberic acid | | do | Do. |

The amount of crosslinking agent used to produce the polyamide amines and polyether amines in the foregoing table is calculated so that, after all the available crosslinker has been consumed, the final product is still well soluble in water and forms a viscous solution of 20–40% strength.

The crosslinking agent of Formula IX is produced by the quaternation in aqueous solution of 1 mole of N,N,N',N'-tetramethylethylenediamine-dihydrochloride with 2 moles of epichlorohydrin at a temperature of 25° increasing to 55°. It corresponds to the formula

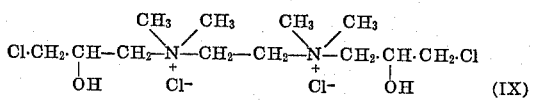

and is applied as a 50% aqueous solution.

The crosslinker of formula

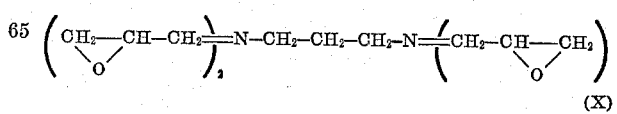

is formed by the reaction of excess epichlorohydrin with 1,3-diaminopropane in methanolic solution at room temperature, with subsequent splitting off hydrogen chloride in aqueous dioxane solution at about 20° by means of sodium hydroxide.

The crosslinking agents of formulae

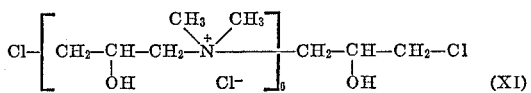

and

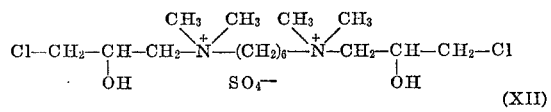

are obtained in accordance with the procedure given in Example 1, (XI) with 6 moles of dimethylamine, 1 mole of HCl and 7 moles of epichlorohydrin and (XII) with 1 mole of N,N,N',N'-tetramethylhexamethylenediamine sulphate and 2 moles of epichlorohydrin.

Having thus disclosed the invention what we claim is:

1. A brightening preparation comprising an anionic optical brightener and a water soluble polyamide amine or polyether amine in the weight ratio of 1:0.1 to 1:15, the anionic optical brightener being selected from the group consisting of brighteners of formula

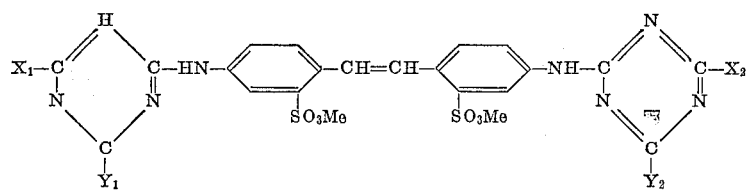

where Me stands for a monovalent cation, $X_1$ and $X_2$, independently of each other, for an alkoxy, alkylamino, hydroxyalkylamino, N-alkyl-N-hydroxyalkylamino, dihydroxyalkylamino or N-cyanalkyl-N-hydroxy-alkylamino radical or for the morpholine or piperidine radical, and $Y_1$ and $Y_2$, independently of each other, for phenoxy, an amino group, an alkylamino group or a phenylamino, naphthylamino or diphenylamino group and where alkyl and alkoxy bear 1 to 6 carbon atoms and the aryl radicals may bear as substituents halogen atoms, alkyl, alkoxy, acylamino, sulphonic acid or carboxylic acid groups, 3,7-diacylamino-dibenzothiophenedioxide-2,8-disulfonates, 7-amino coumarine, stilbenylnaphthotriazoles of formula

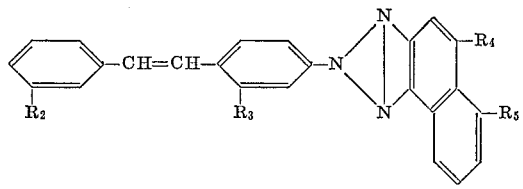

wherein $R_2$ is —$SO_3Na$, H or Cl, $R_3$, $R_4$ and $R_5$ are —$SO_3Na$ or H, at least one of the radicals $R_2$, $R_3$, $R_4$ or $R_5$ being —$SO_3Na$, the compound of formula

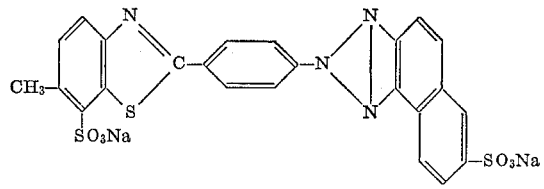

3,3',5,5',7,7'-hexamethyl-oxacyanine-p-sulfonate, 2,2'-bis-[(phenylvinylidene)-6,6'-oxazole] - sulphonate, 2,2'-bis-[(phenylvinylidene)-6,6'-thiazole] - sulphonate, 2,2'-bis-[(phenylvinylidene)-6,6'-imidazole]-sulphonate, 2-styryl-5-phenyloxazole-sulphonate, 2-naphthyl-5-phenylthiazole-sulphonate, 2-naphthyl-5-phenylimidazole-sulphonate, and α,β-di-(benzimidazolyl-2)-ethylene- or -4,5-diphenylimidazolone-sulphonates, the polyamide amine being produced by condensing a dicarboxylic acid of formula $$HOOC—C_mH_{2m}—COOH$$

where $m$ represents a whole number from 4 to 8, or the functional derivative of such an acid, with a polyalkylene polyamine which contains two primary amino groups, at least one imino group and alkylene groups having 2 to 4 carbon atoms, in a molecular ratio of 0.8:1 to 1.2:1 and reacting the condensation product with a crosslinking agent selected from the group consisting of 1,2-dichlorethane, divinyl sulphone, diallylamine, epichlorohydrin, epibromohydrin, diglycidyl ether and the compounds of formula

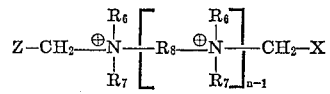

where $n$ represents a number from 1 to 8, $R_6$ and $R_7$ each represents a lower alkyl or hydroxyalkyl, $R_8$ represents an alkylene radical with 2 to 6 carbon atoms, a 2-hydroxy-1,3-propylene radical or one of the radicals $$—CH_2CH_2—NH—CO—NH—CH_2—CH_2—$$

or $$—CH_2—CH_2—CH_2—NH—CO—NH—CH_2—CH_2—CH_2—$$

and Z represents

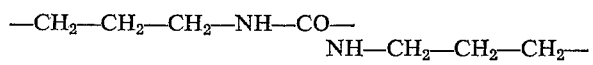

and the polyether amine being produced by the reaction, in excess amounts, of aliphatic polyamines, which have molecular weights of maximum 200, contain at least one primary or two secondary amino groups and may bear hydroxyl groups, with polyepihalogenohydrins bearing 3 to 25 halogenomethyl groups, followed by removal of the excess polyamine by distillation and reaction of the resulting polyether amine with a crosslinking agent as defined above in aqueous solution to a point at which the viscosity increases while the reaction mixture remains water soluble, on which any free amino groups present are wholly or partly converted into their salts by the addition of acid.

2. A brightening preparation according to claim 1, in which the weight ratio of the optical brightener to the polyamide amine or polyether amine is 1:3 to 1:11.

3. A brightening preparation according to claim 1, in which the weight ratio of the optical brightener to the polyamide amine or polyether amine is 1:0.15 to 1:0.6.

4. A brightening preparation according to claim 1, wherein the anionic optical brightener is of formula

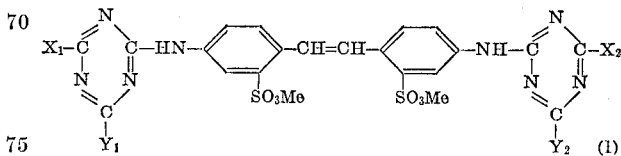

(1)

5. A brightening preparation according to claim 1 which comprises 12.5 weight percent of the brightener of formula

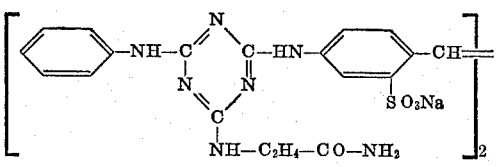

4.8 weight percent of the brightener of formula

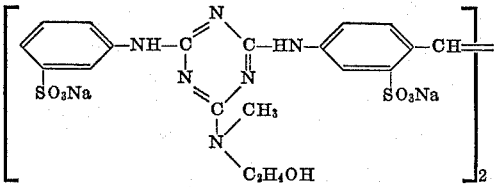

and 10.2 weight percent of the polyamide amine obtained by condensing 1.06 moles of diethylene triamine with 1 mole of adipic acid and reacting with 0.112 mole of the crosslinking agent of formula

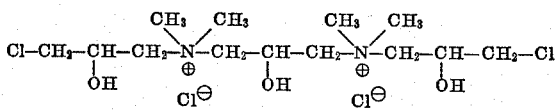

6. A brightening preparation according to claim 1 which comprises 12.2 weight percent of the brightener of formula

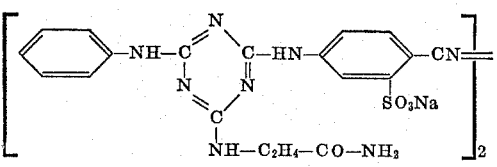

7.4 weight percent of the brightener of formula

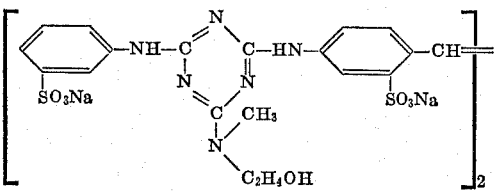

and 5 parts of the polyether amine obtained by reacting 1 gram equivalent of polyepichlorohydrin (molecular weight=1530)

with 1 mole of ethylene diamine and then with 0.013 mole of the crosslinking agent of formula

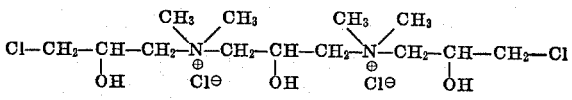

7. A brightener preparation according to claim 1 which comprises 3.7 weight percent of the brightener of formula

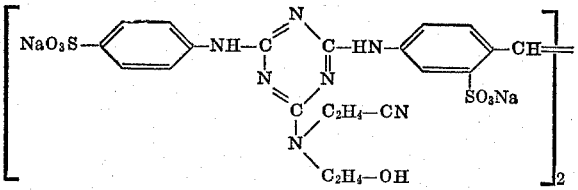

and 13 weight percent of the polyamid amine obtained by condensing 1.06 moles of diethylene triamine with 1 mole of adipic acid and reacting with 0.112 mole of the crosslinking agent of formula

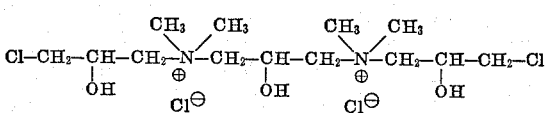

8. A brightening preparation according to claim 1 which comprises 3.33 weight percent of the brightener of formula

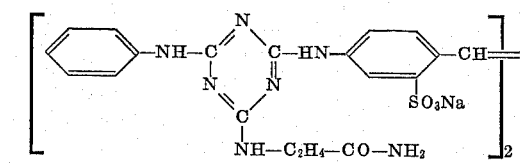

and 20.1 weight percent of the polyamide amine obtained by condensing 1.06 moles of diethylene triamine with 1 mole of adipic acid and reacting with 0.135 mole of the crosslinking agent of formula

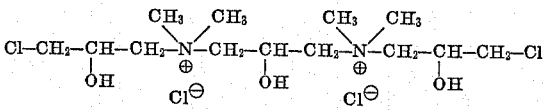

9. A brightening preparation according to claim 1 which comprises 3.33 weight percent of the brightener formula

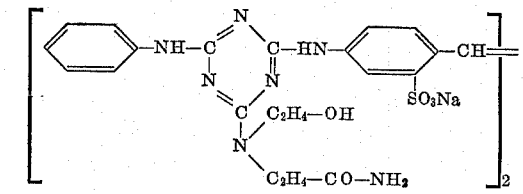

and 16.7 weight percent of the polyamide amine obtained by condensing 1.06 moles of diethylene triamine with 1 mole of adipic acid and reacting with 0.135 mole of the crosslinking agent of formula

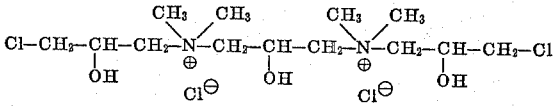

10. A brightening preparation according to claim 1 which comprises 2 weight percent of the brightener formula

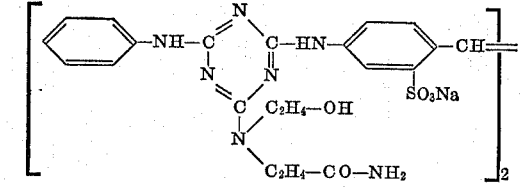

and 20.7 weight percent of the polyamide amine obtained by condensing 1.06 moles of diethylene triamine with 1 mole of adipic acid and reacting with 0.135 mole of the crosslinking agent of formula

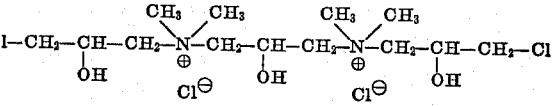

References Cited
UNITED STATES PATENTS

| | | |
|---|---|---|
| 3,406,070 | 10/1968 | Oetiker et al. ____ 252—301.2 W |
| 3,449,257 | 6/1969 | Tuite et al. _____ 252—301.2 W |
| 3,475,190 | 10/1969 | Fischer et al. ____ 252—301.2 W |

ROBERT D. EDMONDS, Primary Examiner

U.S. Cl. X.R.

117—33.5 R; 162—162